(12) United States Patent
Pearson et al.

(10) Patent No.: US 7,433,899 B2
(45) Date of Patent: Oct. 7, 2008

(54) APPARATUS, SYSTEM, AND METHOD FOR MANAGING MULTIPLE COPY VERSIONS

(75) Inventors: Anthony Steve Pearson, Tucson, AZ (US); Henry Verdugo Valenzuela, Tucson, AZ (US); Glenn Randle Wilcock, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 10/790,609

(22) Filed: Mar. 1, 2004

(65) Prior Publication Data

US 2005/0193038 A1 Sep. 1, 2005

(51) Int. Cl.
G06F 17/30 (2006.01)
(52) U.S. Cl. .......................... 707/203; 707/204; 707/3; 711/162; 455/403
(58) Field of Classification Search .................. 707/203
See application file for complete search history.

(56) References Cited

U.S. PATENT DOCUMENTS

| | | | | |
|---|---|---|---|---|
| 5,403,639 A | * | 4/1995 | Belsan et al. | 707/204 |
| 5,634,052 A | * | 5/1997 | Morris | 707/1 |
| 5,806,075 A | | 9/1998 | Jain et al. | 707/201 |
| 5,822,773 A | | 10/1998 | Pritchard et al. | 711/162 |
| 5,937,343 A | * | 8/1999 | Leung | 455/403 |
| 5,937,415 A | | 8/1999 | Sheffield et al. | 707/204 |
| 6,108,749 A | | 8/2000 | White et al. | 711/112 |
| 6,119,208 A | | 9/2000 | White et al. | 711/162 |
| 6,128,699 A | | 10/2000 | Golding | 711/112 |
| 6,321,239 B1 | | 11/2001 | Shackelford | 707/206 |
| 6,351,792 B1 | | 2/2002 | Mililo | 711/162 |
| 6,363,385 B1 | | 3/2002 | Kedem et al. | 707/10 |

(Continued)

FOREIGN PATENT DOCUMENTS

JP 2002025182 A 1/2002

(Continued)

OTHER PUBLICATIONS

F.A. Schwartz et al., "Method For Consistent Data Replication For Collection Management In A Dynamic Partially Connected Collection", IBM Technical Disclosure Bulletin, vol. 33 No. 5, Oct. 1990, pp. 454-464.

Primary Examiner—Don Wong
Assistant Examiner—Binh V Ho
(74) Attorney, Agent, or Firm—Kunzler & McKenzie

(57) ABSTRACT

An apparatus, system, and method are disclosed for managing multiple copy versions of a source volume. In one embodiment, the apparatus includes a replication record management module, a pre-pairing record management module, and a copy record module. The replication record management module is configured to maintain a current replication record that is descriptive of a current copy version of the source volume. The pre-pairing record management module is configured to maintain a future pre-pairing record that is descriptive of a future copy version of the source volume. The copy record module is configured to create a copy record from a pre-copy record. The pre-copy record may be either the current replication record or the future pre-pairing record. The apparatus, system, and method beneficially maintain multiple records to describe different states for a particular copy version and dynamically handle changes to a source pool, a target pool, or both in a data copy environment.

20 Claims, 8 Drawing Sheets

U.S. PATENT DOCUMENTS

| | | | |
|---|---|---|---|
| 6,397,125 B1 * | 5/2002 | Goldring et al. | 700/200 |
| 6,405,294 B1 * | 6/2002 | Hayter | 711/162 |
| 6,499,041 B1 | 12/2002 | Breslau et al. | 707/505 |
| 6,549,992 B1 * | 4/2003 | Armangau et al. | 711/162 |
| 6,611,850 B1 * | 8/2003 | Shen | 707/204 |
| 6,611,923 B1 | 8/2003 | Mutalik et al. | 701/4 |
| 6,959,369 B1 * | 10/2005 | Ashton et al. | 711/162 |
| 6,978,282 B1 * | 12/2005 | Dings et al. | 707/204 |
| 6,981,114 B1 * | 12/2005 | Wu et al. | 711/162 |
| 2002/0112134 A1 * | 8/2002 | Ohran et al. | 711/162 |
| 2005/0171938 A1 * | 8/2005 | Fisher et al. | 707/3 |

FOREIGN PATENT DOCUMENTS

| | | |
|---|---|---|
| WO | WO9848347 A1 | 9/2000 |
| WO | WO02017056 A2 | 9/2002 |

* cited by examiner

APPARATUS, SYSTEM, AND METHOD FOR MANAGING MULTIPLE COPY VERSIONS

BACKGROUND OF THE INVENTION

1. Field of the Invention

This invention relates to data backup and more particularly relates to managing multiple copy versions of data from a source volume. Specifically, this invention relates to dynamically selecting and maintaining target volumes over multiple copy versions in a data copy environment.

2. Description of the Related Art

Data copy operations and tools are extremely important in today's computing environment because that is primarily how data is communicated among applications and users. One central objective of copying data is to create backup copies of data in case of failure or for restoration of a previous copy version corresponding to a specific state of the data copy environment at a particular instant in time.

Over time, data copy utilities have been developed that allow data copy operations to be performed in less time than before. Significantly, many point-in-time data copy technologies, such as FlashCopy and SnapShot, are capable of creating a virtual copy of trillions of data (Terabytes) in a matter of minutes, or even fractions of minutes. Given the huge amounts of data created and stored for all types of data applications, from personal computing to high-end data mining and analyzing, it is very important to be able to back up this data and to back it up in a way that is minimally interruptive to the data processing applications.

One way in which data backup intrusions are minimized is by using pre-pair processing in the data replication applications. Pre-pair processing employs pre-selection of a set of target volumes (also referred to as backup volumes) for a pre-defined set of source volumes. Pre-selection of the target volumes performs the pairing of sources and targets outside of the copy window so that the copy pairs are created before any data copying is performed. In this way, the copy pairing does not use critical processing time on the source computer to determine which targets will be used to back up the datasets on the source volumes. However, pre-selection of the target volumes introduces certain challenges to the data copy operations.

In certain scenarios, it may be difficult to maintain multiple sets of records to describe different states for a single source pool (a set of source volumes). This is apparent when source volumes are either added to or removed from the source pool. Replication records may describe previous or current copy versions of the source pool while pre-pairing records may indicate copy pairs that may be used in future copy versions. When changes to the source pool occur, the replication records and pre-pairing records may need to be updated individually and/or reconciled with each other in order to properly track the copies of the source volumes, the availability of the target volumes, and so forth.

Another potential challenge arises with specific reference to creating copy versions after a change has occurred in either a source pool or a target pool. Likewise, a further challenge may become present in maintaining the various data copy records for multiple sequential copy versions in the data copy environment. This challenge is amplified as the number of copy versions that are maintained increases.

What are needed are an apparatus, system, and method that are capable of addressing the challenges presented in current data backup and data copy environments. Beneficially, such an apparatus, system, and method would specifically overcome the known problems related to maintaining multiple sets of records, handling changes in the data copy environment that affect the copy pairs in the pre-pairing and replication records, and maintaining the records over a plurality of copy versions of a source pool in the data copy environment.

SUMMARY OF THE INVENTION

The present invention has been developed in response to the present state of the art, and in particular, in response to the problems and needs in the art that have not yet been fully solved by currently available data copy systems and environments. Accordingly, the present invention has been developed to provide an apparatus, system, and method for managing multiple copy versions of a source volume that overcome many or all of the above-discussed shortcomings in the art.

The apparatus for managing multiple copy versions of a source volume is provided with a logic unit containing a plurality of modules configured to functionally execute the necessary steps of managing multiple copy versions of a source volume. These modules in the described embodiments include a replication record management module, a pre-pairing record management module, and a copy record module.

In one embodiment, the replication record management module is configured to maintain a current replication record that is descriptive of a current copy version of a source volume in a source pool. The pre-pairing record management module is configured to maintain a future pre-pairing record that is descriptive of a future copy version of the source volume. The copy record module is configured to create a copy record from a pre-copy record, where the pre-copy record is either the current replication record or the future pre-pairing record.

In further embodiments of the apparatus, the plurality of modules also may include a replication module, a pre-pairing module, and a target selection module. The apparatus also may access information contained in a backup information module, a source dataset inventory, and a storage media inventory.

In an alternate embodiment of the present invention, the apparatus is configured to dynamically manage a plurality of replication records and pre-pairing records in response to a change in the data copy environment. For example, the apparatus may update the pre-pairing records if a source volume is added to or removed from the source pool. Similarly, the apparatus may update the pre-pairing records if a target volume is added to or removed from a target pool.

In a further embodiment, the apparatus may update copy pairs within a pre-pairing record in order to account for other changes in the data copy environment. Still further, the apparatus may be configured to dynamically manage the replication records and/or the pre-pairing records by verifying the current status of a source or target volume in the data copy environment and updating one or more records to reflect a change in the volume status.

A system of the present invention is also presented for managing multiple copy versions of a source volume. The system may be embodied in a data copy environment, in one embodiment, and more specifically in a backup manager, in another embodiment. In particular, the system, in one embodiment, includes a storage subsystem, a backup manager, and a backup management apparatus, as described above.

In a further embodiment, the system may be configured to store backup information, including one or more of the following: a volume inventory, a copy pool inventory, a backup dataset inventory, an alternative backup dataset inventory, a replication record, and a pre-pairing record.

A method of the present invention is also presented for managing multiple copy versions of a source volume. The method in the disclosed embodiments substantially includes the steps necessary to carry out the functions presented above with respect to the operation of the described apparatus and system. In one embodiment, the method includes maintaining a current replication record that is descriptive of a current copy version of a source volume, maintaining a future pre-pairing record that is descriptive of a future copy version of the source volume, and creating a copy record from a pre-copy record, where the pre-copy record is either the current replication record the future pre-pairing record.

In further embodiments, the method also may include replicating the source volume on a target volume, creating a new copy version of the source volume according to the copy record, establishing a new replication record that is descriptive of the new copy version of the source volume, comparing the new replication record to the current replication record, or breaking a copy pair for a removed source volume present in the current replication record, but not present in the new replication module. In further embodiment of the present invention, the method also may include maintaining a previous replication record descriptive of a previous copy version, maintaining a previous pre-pairing record descriptive of a previous copy version, creating the future pre-pairing record, locating a target volume available for use to create the copy version of the source volume, verifying the future pre-pairing record, or verifying the current replication record.

The apparatus, system, and method beneficially maintain multiple records to describe different states for a particular copy version and dynamically handle changes to a source pool, a target pool, or both in a data copy environment.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
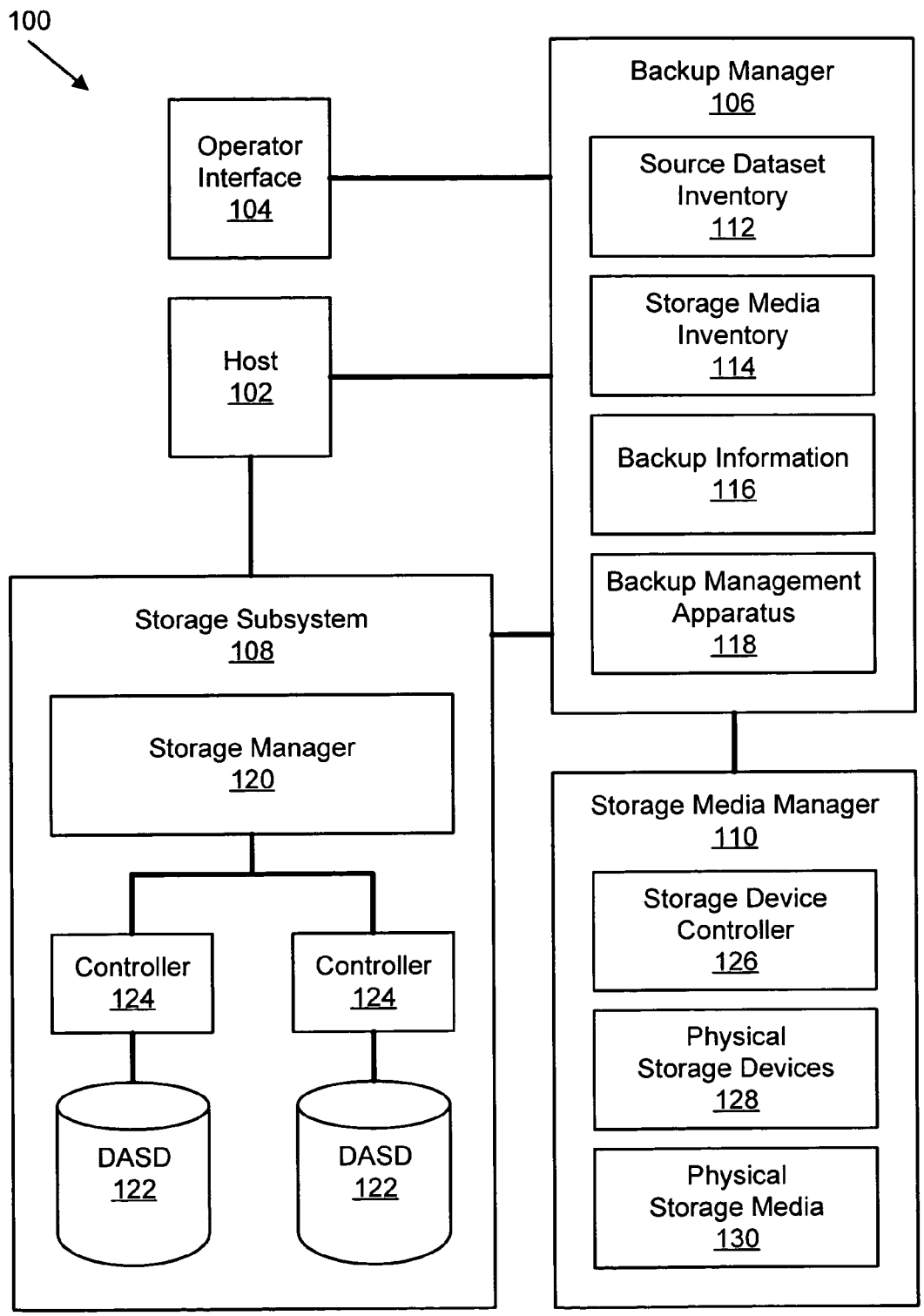
FIG. 1 is a schematic block diagram illustrating one embodiment of a data copy environment in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single dataset, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Data Copy Environment

FIG. 1 depicts one embodiment of a data copy environment 100 in which certain embodiments of the present invention may be employed. The illustrated data copy environment 100 includes one or more hosts 102, one or more operator interfaces 104, a backup manager 106, a storage subsystem 108, and a storage media manager 110.

The hosts 102 and operator interfaces 104 may be any computational device known in the art, such as a personal computer, a workstation, a server, a mainframe, a hand held computer, a palm top computer, a telephony device, network appliance, human operator terminals, etc., or a combination of the foregoing. The hosts 102 and operator interfaces 104 may include any operating system known in the art, such as the IBM OS/390® or z/OS® operating system. In certain implementations, the hosts 102 may comprise application programs. The operator interface 104 may include features such as a computer, input/output terminal, keyboard, video monitor, dials, switches, or other human/machine interface.

The one or more hosts 102 and operator interfaces 104 are shown connected to the backup manager 106 for ease of illustration. In certain implementations, the backup manager 106 may be implemented as software residing on the hosts 102 and/or operator interfaces 104. In certain implementations, the backup manager 106 may be implemented in software residing on a server or other computational device. In further embodiments, the backup manager 106 may be implemented with logic circuitry. The backup manager 106 includes a source dataset inventory 112, a storage media inventory 114, backup information 116, and a backup management apparatus 118. The source dataset inventory 112, storage media inventory 114, backup information 116, and backup management apparatus 118 will be described further with reference to FIG. 3.

Among other components, the illustrated storage subsystem 108 includes a storage manager 120, along with one or more direct access storage devices (DASDs) 122 and their associated controllers 124. The storage subsystem 108 may include other storage media in place of or in addition to the DASDs 122. The storage manager 120 manages read/write operations on the DASDs 122 in response to stimuli from a storage command source, such as an external user application running on a host 102, a system administrator via the operator interface 104, the backup manager 106, and/or internal processes of the storage manager 120.

The storage media manager 110 includes a storage device controller 126, one or more physical storages devices 128 (e.g., tape drives), and one or more physical storage media 130 (e.g., magnetic tapes). The physical storage media 130 may be any removable and/or remote storage media.

Considering the depicted components the data copy environment 100 in greater detail, the backup manager 106 comprises a processing entity that directs the storage subsystem 108 to back up customer source data as backup data on the DASDs 122. The backup manager 106 is coupled to one or more operator interfaces 104 and hosts 102 and receives directions and other input from the one or more operator interfaces 104 and hosts 102. The backup manager 106 includes or has access to the source dataset inventory 112, storage media inventory 114, and backup information 116.

Each of the source dataset inventory 112, storage media inventory 114, and/or backup information 116 may be embodied in various storage constructs, depending upon the implementation specifics of the backup manager 106. For example, the source dataset inventory 112 may be stored in memory, storage buffers, or registers. The storage media inventory 114 and/or backup information 116 may be stored on disk, magnetic tape, or another persistent storage media. Contents of the source dataset inventory 112, storage media inventory 114, and backup information 116 are described in greater detail with reference to FIG. 3.

One example of the storage subsystem 108 is a machine such as a storage manager component of an IBM brand S/390® machine. The storage subsystem 108 receives instructions and data from the hosts 102, the backup manager 106, or a combination thereof. In one implementation, the operator interface 104 includes a software module (not shown) to process operator commands for input to the storage manager 120. As an example, this software may comprise the IBM brand Data Facility System Managed Storage (DFSMS) software module.

The storage manager 120, which utilizes, for example, the IBM brand z/OS® operating system, directs operations of the storage subsystem 108. In certain implementations, an interface (not shown) is provided to conduct communications between the storage manager 120 and the storage controllers 124 that manage the DASDs 122.

The DASD controllers 124 manage read/write operations on the DASDs 122 gas directed by the storage manager 120. In one embodiment, the DASDs 122 may be implemented as a redundant array of inexpensive disks (RAID) storage. In this example, the DASD controllers 124 and the DASDs 122 may be implemented by using a commercially available product, such as an IBM Enterprise Storage Server® (ESS).

In certain embodiments, the controllers 124 may manage the DASDs 122 according to home area architecture, log structured array, or another storage strategy. Also as illustrated, the storage manager 120 manages data of the DASDs 122 according to "volumes," which are referred to as "logical" or "virtual" volumes. Instead of volumes, however, the storage manager 120 may manage data according to any other useful data unit, such as physical device, logical device, logical surface or cylinder, sector, collection of pages, address range(s), etc. Reference to a "volume" herein is understood generally to be equivalently applicable to all of these and other data units in their respective systems. The controllers 124 receive data access requests from the storage manager 120 in terms of logical volumes and implement the data access requests by translating them into terms of physical storage locations on the physical disks 130 used to implement the DASDs storage 122.

In certain implementations, the backup manager 106 retrieves data from the DASDs 122 through the storage manager 120. The backup manager 106 forwards the data to the storage device controller 126 to store the data on physical storage media 130.

Volume Environment

Figure 2:
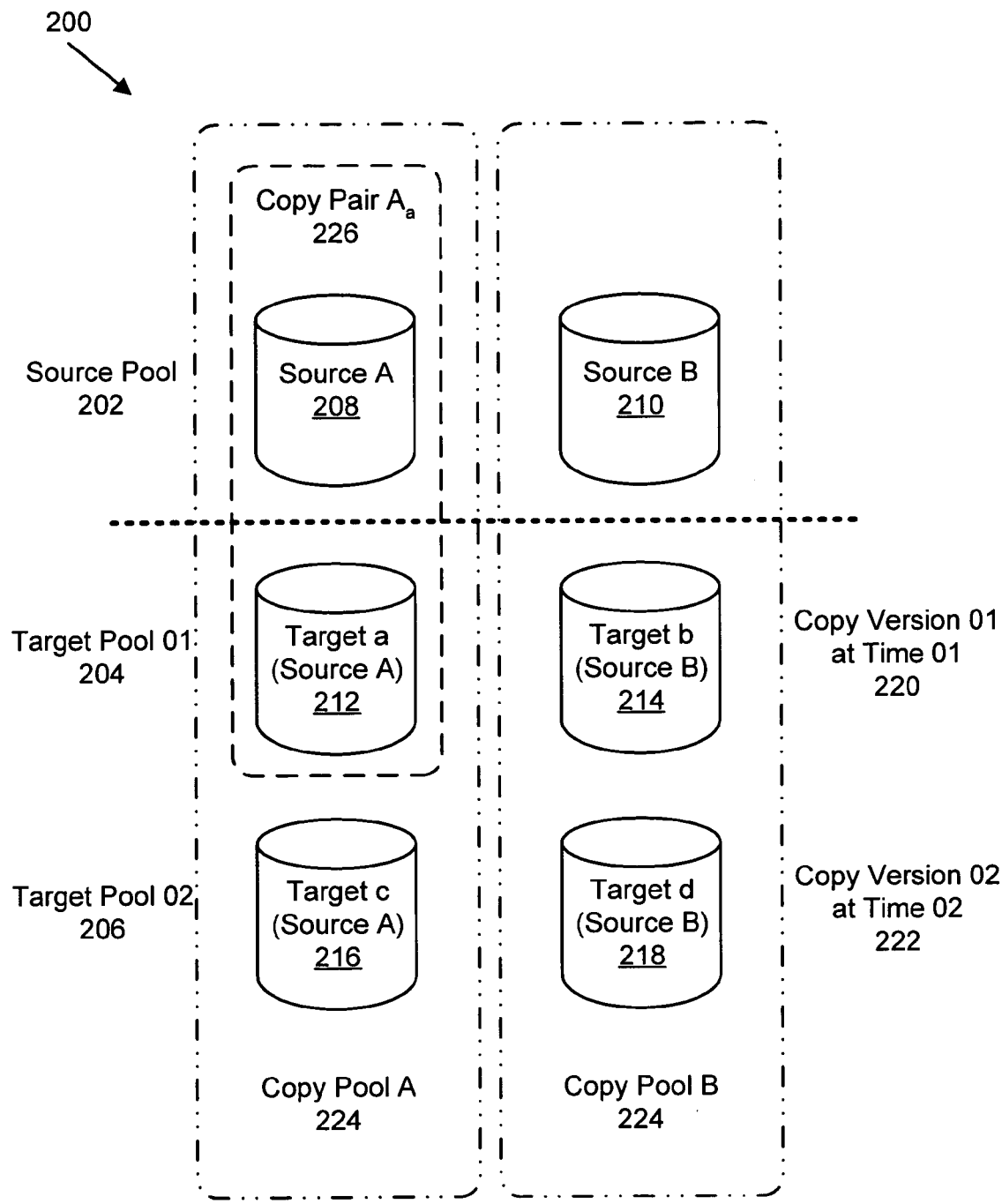
FIG. 2 is a schematic block diagram illustrating one embodiment of a volume environment in accordance with the present invention.

FIG. 2 depicts one embodiment of a volume environment 200 as may be employed in the data copy environment 100 of FIG. 1. In certain embodiments, the volume environment 200 is representative of the DASDs 122 of the storage subsystem 108. The illustrated volume environment 200 includes a source pool 202, a first target pool "01" 204, and a second target pool "02" 206. In one embodiment, the number of target pools 204, 206 corresponds to the number of backup copies that may be created for each source pool 202. For example, the depicted volume environment 200 has two target pools 204, 206 for a single source pool 202, which allows for two backup copies of the source pool 202.

The source pool 202 comprises a first source volume "A" 208 and a second source volume "B" 210. Although only two source volumes 208, 210 are shown in the depicted source pool 202, other embodiments of the volume environment 200 may include fewer or more source volumes 208, 210. In one embodiment, each of the source volumes 208, 210 comprises a logical volume of data present in one or more of the DASDs 122. Multiple logical volumes may reside on each DASD 122.

The first target pool "01" 204 includes a first target volume "a" 212 and a second target volume "b" 214. Likewise, the second target pool "02" 206 includes a third target volume "c" 216 and a fourth target volume "d" 218. In the depicted embodiment, the first target pool "01" 204 represents a first copy version "01" 220 and the second target pool "02" 206 represents a second copy version "02" 222. The first copy version "01" 220 is a backup copy of the source volumes 208, 210 at a first instance in time. Similarly, the second copy version "02" 222 is a backup copy of the source volumes 208, 210 at a second instance in time.

Like each source volume 208, 210, the target volumes 212, 214, 216, 218 each comprise a logical volume of data present in one or more of the DASDs 122. Similarly, multiple logical volumes may reside on each DASD 122. In one embodiment, the copy version "01" 220 is created prior to the copy version "02" 222. Alternately, the copy version "02" 222 may be created prior to the copy version "01" 220. In a further embodiment, the first target pool 204 may comprise a copy version "03" (not shown) rather than the depicted copy version "01" 220.

By way of definition, the first source volume "A" 208, first target volume "a" 212, and third target volume "c" 216 together form a first copy pool "A" 224. The copy pool "A" 224 is identified by a common dataset, which in this case is the dataset stored on the source volume "A" 208. In one embodiment, a dataset may comprise one or more files, pages, bytes, records, tables, or other units of data.

The difference among these volumes 208, 212, 216 of the copy pool "A" 224 is the instance of time at which the dataset is stored on each of the volumes 208, 212, 216. For example, the dataset stored on the source volume "A" 208 is a current copy of the dataset as seen by an application program or a user. The dataset stored on the target volume "a" 212 is a backup copy created at a first instance of time. The dataset stored on the target volume "c" 216 is a backup copy created at a second instance of time.

The copy pool "A" 224 may be further defined to include a copy pair 226, which describes the relationship between the source volume "A" 208 and, for example, the target volume "a" 212. Each pair formed by the source volume "A" 208 and one of the target volumes 212, 216 may be considered a copy pair 226. For reference purposes, the copy pair 226 formed by the source volume "A" 208 and the target volume "a" 212 may be referred to as the copy pair "$A_a$" 226. Similarly, the copy pair 226 formed by the source volume "A" 208 and the target volume "c" 216 may be referred to as the copy pair "$A_c$" 226.

The characteristics of the copy pool "A" 224 are analogous for the illustrated copy pool "B" 224. In another embodiment of the volume environment 200, the source pool 202 may include a plurality of source volumes 208, 210. Similarly, each of the target pools 204, 206 may include a substantially equal plurality of target volumes 212, 214, 216, 218. In a further embodiment, the volume environment 200 may include one or many target pools 204, 206, depending on the number of backup copies of the source pool that are desired. Still further, in another embodiment, the volume environment 200 may include multiple source pools 202 with similar characteristics to the described source pool 202 and one or more corresponding target pools 204, 206 for each source pool 202.

The status at times T1 and T2 of the volume environment 200 illustrated in FIG. 2 may be described as shown in Table 2.1 below. The times "T1" and "T2" in Table 2.1 refer to the status of the backup copies on the various target volumes 212, 214, 216, 218 after completion of the first version "V1" and the second version "V2." In one embodiment, the backup copies may be cumulative so that both the first version "V1" and the second version "V2" are maintained through time "T2."

The record type "RR" stands for "replication record," which will be described in more detail with reference to FIG. 3. The information in Table 2.1 indicates that backup copies of source volume "A" 208 are stored on target volumes "a" 212 and "c" 216, while backup copies of source volume "B" 210 are stored on target volumes "b" 214 and "d" 218. Another way of annotating these copy pairs 226 is "$A_a$," "$A_c$," "$B_b$," and "$B_d$." However, the specific form of annotation used in this description is not controlling of the present invention.

TABLE 2.1

| | | | Volume Environment at Time 02 | | | |
|---|---|---|---|---|---|---|
| | | | COPY PAIR | | COPY PAIR | |
| TIME | VERSION | RECORD | SOURCE | TARGET | SOURCE | TARGET |
| T1 | V1 | RR | A | a | B | b |
| T2 | V2 | RR | A | c | B | d |

Figure 3:
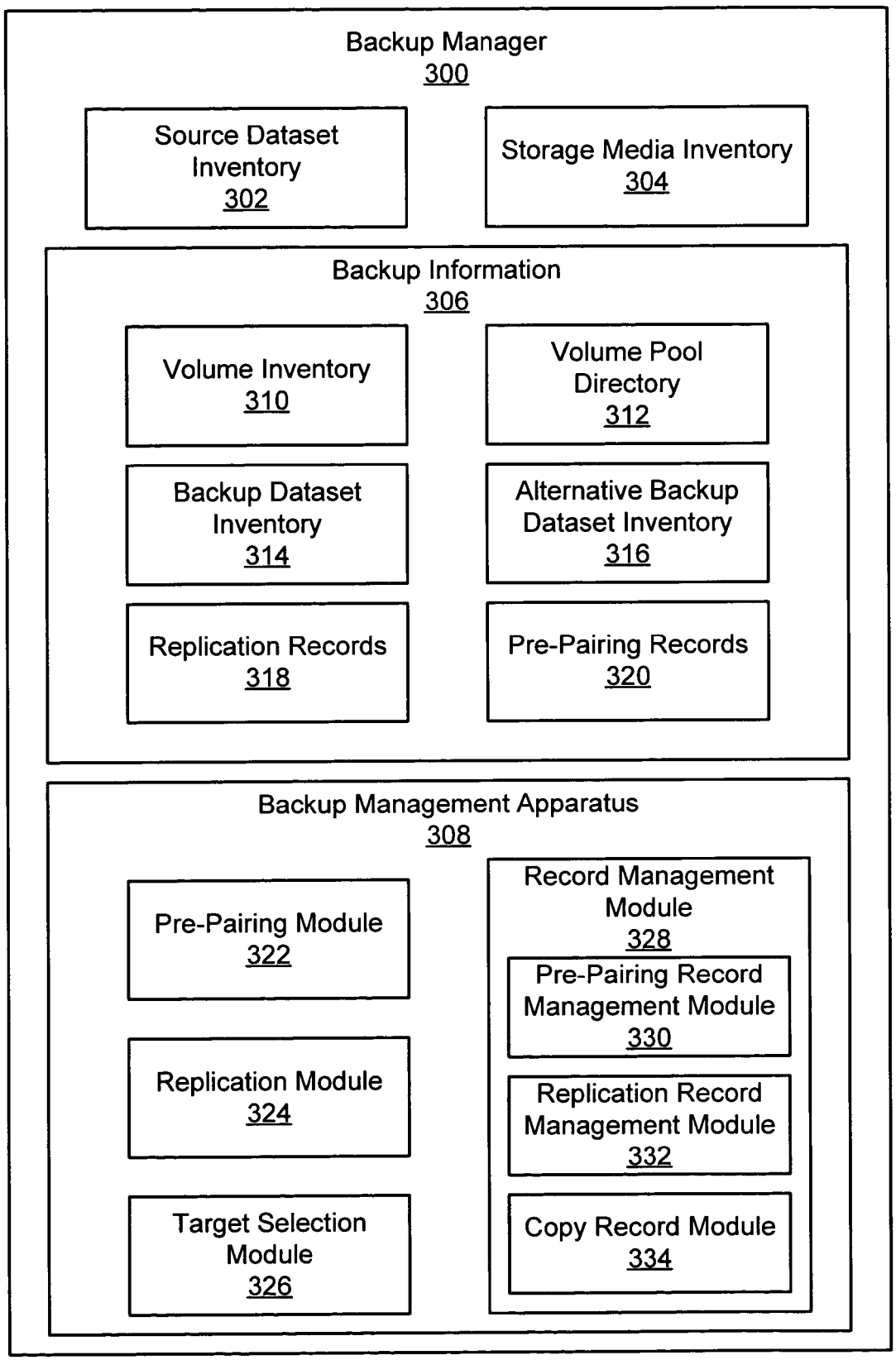
FIG. 3 is a schematic block diagram illustrating one embodiment of a backup manager given by way of example of the backup manager of FIG. 1.

FIG. 3 depicts one embodiment of a backup manager 300 that is substantially similar to the backup manager 106 of FIG. 1. The illustrated backup manager 300 includes a source dataset inventory 302, a storage media inventory 304, a backup information module 306, and a backup management apparatus 308.

Source Dataset Inventory

In one embodiment, the source dataset inventory 302 includes a dataset identifier and an associated source volume identifier, as shown in Table 3.1. The source dataset inventory 302 lists each dataset in each of the source volumes 208, 210. For example, the source dataset inventory 302 of Table 3.1 shows that dataset "X" is located in the source volume "A" 208. Likewise, the dataset "Y" is located in the source volume "A" 208. The dataset "Z" however, is located either partially or fully in both the source volume "A" 208 and the source volume "B" 210. In certain implementations, the source dataset inventory 302 may be stored in memory (e.g., at the host 102 when the backup manager 300 is implemented as software at the host 102).

TABLE 3.1

Source Dataset Inventory

| DATASET IDENTIFIER | SOURCE VOLUME IDENTIFIER |
|---|---|
| X | A |
| Y | A |
| Z | A, B |

Storage Media Inventory

The storage media inventory 304 lists each source volume 208, 210 and the storage media 130 on which the source volume 208, 210 is stored. In one embodiment, the storage media inventory 304 includes a source volume identifier and a storage media identifier, as shown in Table 3.2. In a further embodiment, the storage media inventory 304 additionally may include a version time stamp token or other pertinent metadata. In one embodiment, the storage media inventory 304 may be stored in persistent storage (e.g., disk).

TABLE 3.2

Storage Media Inventory

| SOURCE VOLUME IDENTIFIER | STORAGE MEDIA IDENTIFIER |
|---|---|
| A | Tape 1 |
| B | Tape 2 |

For example, the storage media inventory 304 of Table 3.2 shows that the source volume "A" 208 is stored on a storage medium 130 identified as "Tape 1", while the source volume "B" 210 is stored on a storage medium 130 identified as "Tape 2". In certain implementations, the storage media inventory 304 does not represent a one-to-one relationship between the source volumes 208, 210 and storage media 130. For example, it is possible for multiple source volumes 208, 210 to be on a single storage medium 130. It is also possible for one source volume 208, 210 to span multiple storage media 130. In either case, the storage media inventory 304 may be used to list source volumes 208, 210 and the one or more storage media 130 on which the source volumes 208, 210 are stored.

Backup Information

The illustrated backup information module 306 includes various metadata constructs that may reside in the backup manager 300 or may be accessible by the backup manager 300. In one embodiment, the backup information module 306 may be stored in persistent storage (e.g., disk). In the depicted embodiment, the backup information module 306 comprises a volume inventory 310, a volume pool directory 312, a backup dataset inventory 314, an alternative backup dataset inventory 316, one or more replication records 318, and one or more pre-pairing records 320.

Volume Inventory

In one embodiment, the volume inventory 310 identifies the source volumes 208, 210 and the corresponding target volumes 212, 214, 216, 218, as shown in Table 3.3. In other words, the volume inventory 310 provides a list of the copy pairs 226. For instance, the volume inventory 310 of Table 3.3 shows that the source volume "A" 208 corresponds to the target volumes "a" 212 and "c" 216 (identified as copy pairs 226 "$A_a$" and "$A_c$"). Similarly, the source volume "B" 210 corresponds to the target volumes "b" 212 and "d" 216 (identified as copy pairs 226 "$B_b$" and "$B_d$"). In other words, the target volumes "a" 212 and "c" 216 are copy versions 220, 222 of the source volume "A" 208 and the target volumes "b" 214 and "d" 218 are copy versions 220, 222 of the source volume "B" 210.

TABLE 3.3

Volume Inventory

| SOURCE VOLUME IDENTIFIER | TARGET VOLUME IDENTIFIER(S) |
|---|---|
| A | a, c |
| B | b, d |

Volume Pool Directory

The volume pool directory 312, in one embodiment, contains the definition of each source pool 202 and each target pool 204, 206, as shown in Table 3.4. For example, the volume pool directory 312 of Table 3.4 shows that the source pool 202 comprises the source volumes "A" 208 and "B" 210. Similarly, the target pool "01" 204 comprises the target volumes "a" 212 and "b" 214. Likewise, the target pool "02" 206 comprises the target volumes "c" 216 and "d" 218.

TABLE 3.4

Volume Pool Directory

| POOL TYPE | VOLUME POOL IDENTIFIER | VOLUME IDENTIFIER(S) |
|---|---|---|
| SOURCE | SOURCE | A, B |
| TARGET | TARGET 01 | a, b |
| TARGET | TARGET 02 | c, d |

Backup Dataset Inventory

The backup dataset inventory 314, in one embodiment, lists each backup dataset in the storage media 130 and relates the backup datasets to the source volumes 208, 210 from which the datasets originate (i.e., from which a copy of the dataset is taken). Table 3.5 depicts one embodiment of a backup dataset inventory 314. In particular, the backup dataset inventory 314 lists a backup dataset identifier and an originating source volume identifier. For example, the backup dataset inventory 314 of Table 3.5 shows that the backup dataset "X" originates from the source volume "A" 208, and so forth.

TABLE 3.5

Backup Dataset Inventory

| DATASET IDENTIFIER | SOURCE VOLUME IDENTIFIER |
|---|---|
| X | A |
| Y | A |
| Z | A, B |

The backup dataset inventory 314 of Table 3.5 and the source dataset inventory 302 of Table 3.1 are substantially similar with regard to content. However, in one embodiment, the source dataset inventory 302 may be stored in volatile memory, while the backup dataset inventory 314 may be stored in persistent storage, such as in a database or non-volatile storage, for future use. In this way, the source dataset inventory 302 may be discarded when no longer needed after the backup dataset inventory 314 is created and/or updated.

Alternative Backup Dataset Inventory

The alternative backup dataset inventory 316 may be substantially similar to the backup dataset inventory 314, but may also include a version time stamp token for each of multiple copy versions 220, 222 for a given dataset. In a similar manner, an alternative storage media inventory (not shown) may be employed in addition to or in place of the storage media inventory 304 described above. In one embodiment, the alternative storage media inventory also may include a version time stamp token for each of a plurality of copy versions 220, 222 for a given source volume 208, 210.

Replication Records

The replication records 318, in one embodiment, describe the copy pairs 226 that belong to a specific copy version 220, 222 at a given point in time. For example, the data shown in Table 2.1 is representative of two replication records 318. The first replication record 318 correspond to a first copy version 220 "V1" created at time "T1" that includes the copy pairs 226 "$A_a$" and "$B_b$." Similarly, the second replication record 318 corresponds to a second copy version 222 "V2" created at time "T2" that includes the copy pairs 226 "$A_c$" and "$B_d$." In one embodiment, a replication record 318 may be maintained for each existing copy version 220, 222 for a source pool 202. In a further embodiment, replication records 318 also may be maintained for previous copy versions 220, 222 for historical tracking or other purposes.

Pre-Pairing Records

The pre-pairing records 320 are similar in some ways to the replication records 318 described above. Each pre-pairing record 320, in one embodiment, describes the copy pairs 226 that belong to a specific future copy version 220, 222 that may be created. In other words, the pre-pairing records 320 are indicative of what copy versions 220, 222 may be created in the future, rather than descriptive of current or previous copy versions 220, 222.

An example of two pre-pairing records 320 is provided in Table 3.6, which shows a first pre-pairing record 320 corresponding to a first copy version "V1" 220 and a second pre-pairing record 320 corresponding to a second copy version "V2" 222. These pre-pairing records 320 are created prior to creation of the actual replication records 318, which are described above, and the copy versions 220, 222. The pre-pairing records 320 simply indicate the copy pairs 226 that may be used to create the specified copy versions 220, 222 at certain future times.

TABLE 3.6

| | | | Pre-Pairing Records | | | |
|---|---|---|---|---|---|---|
| | VER- | RE- | COPY PAIR | | COPY PAIR | |
| TIME | SION | CORD | SOURCE | TARGET | SOURCE | TARGET |
| T1 | V1 | PPR | A | a | B | b |
| T2 | V2 | PPR | A | c | B | d |

Backup Management Apparatus

The illustrated backup management apparatus 308 is generally configured to create and manage multiple copy versions 220, 222 for a particular source pool 202. In the depicted embodiment, the backup management apparatus 308 includes a pre-pairing module 322, a replication module 324, a target selection module 326, and a record management module 328. In a further embodiment, the record management module 328 comprises a pre-pairing record management module 330, a replication record management module 332, and a copy record module 334.

In one embodiment, the pre-pairing module 322 is configured to create a pre-pairing record 320, as described above and shown by example in Table 3.6. The replication module 324, in one embodiment, is configured to create a copy version 220, 222 of the datasets of one or more source volumes 208, 210 in a source pool 202. The replication module 324 may be configured further to create a replication record 318 that is descriptive of the copy version 220, 222 that may be created. The target selection module 326, in one embodiment, is configured to select a target volume 212, 214, 216, 218 that may be used in a copy pair 226, as described above. In one embodiment, the pre-pairing module 322 may employ the target selection module 326 prior to creating a pre-pairing record 320.

The record management module 328, generally, may be configured to maintain one or more replication records 318 or pre-pairing records 320. Specifically, the pre-pairing record management module 330 is configured, in one embodiment, to manage the creation, deletion, and maintenance of one or more pre-pairing records 320. Similarly, the replication record management module 332, in one embodiment, is configured to manage the creation, deletion, and maintenance of one or more replication records 318.

The copy record module 334, in one embodiment, is configured to create a copy record (not shown) that may be used, for example, by the replication module 324 to create a copy version 220, 222. In a certain embodiment, the copy record may be similar, at least in format, to a replication record 318 or a pre-pairing record 320. In a further embodiment, the copy record may be used to indicate the exact copy pairs 226 to be used to create a specific copy version 220, 222 of a source pool 202. The various modules 322-334 within the backup management apparatus 308 will be referenced below with regard to the methods of operation and use of certain implementations of the present invention.

The following schematic flow chart diagrams that follow are generally set forth as logical flow chart diagrams. As such, the depicted order and labeled steps are indicative of one embodiment of the presented process. Other steps and processes may be conceived that are equivalent in function, logic, or effect to one or more steps, or portions thereof, of the illustrated process. Additionally, the format and symbology employed are provided to explain the logical steps of the process and are understood not to limit the scope of the process. Although various arrow types and line types may be employed in the flow chart diagrams, they are understood not to limit the scope of the corresponding process. Indeed, some arrows or other connectors may be used to indicate only the logical flow of the process. For instance, an arrow may indicate a waiting or monitoring period of unspecified duration between enumerated steps of the depicted process. Additionally, the order in which a particular process occurs may or may not strictly adhere to the order of the corresponding steps shown.

Figure 4:
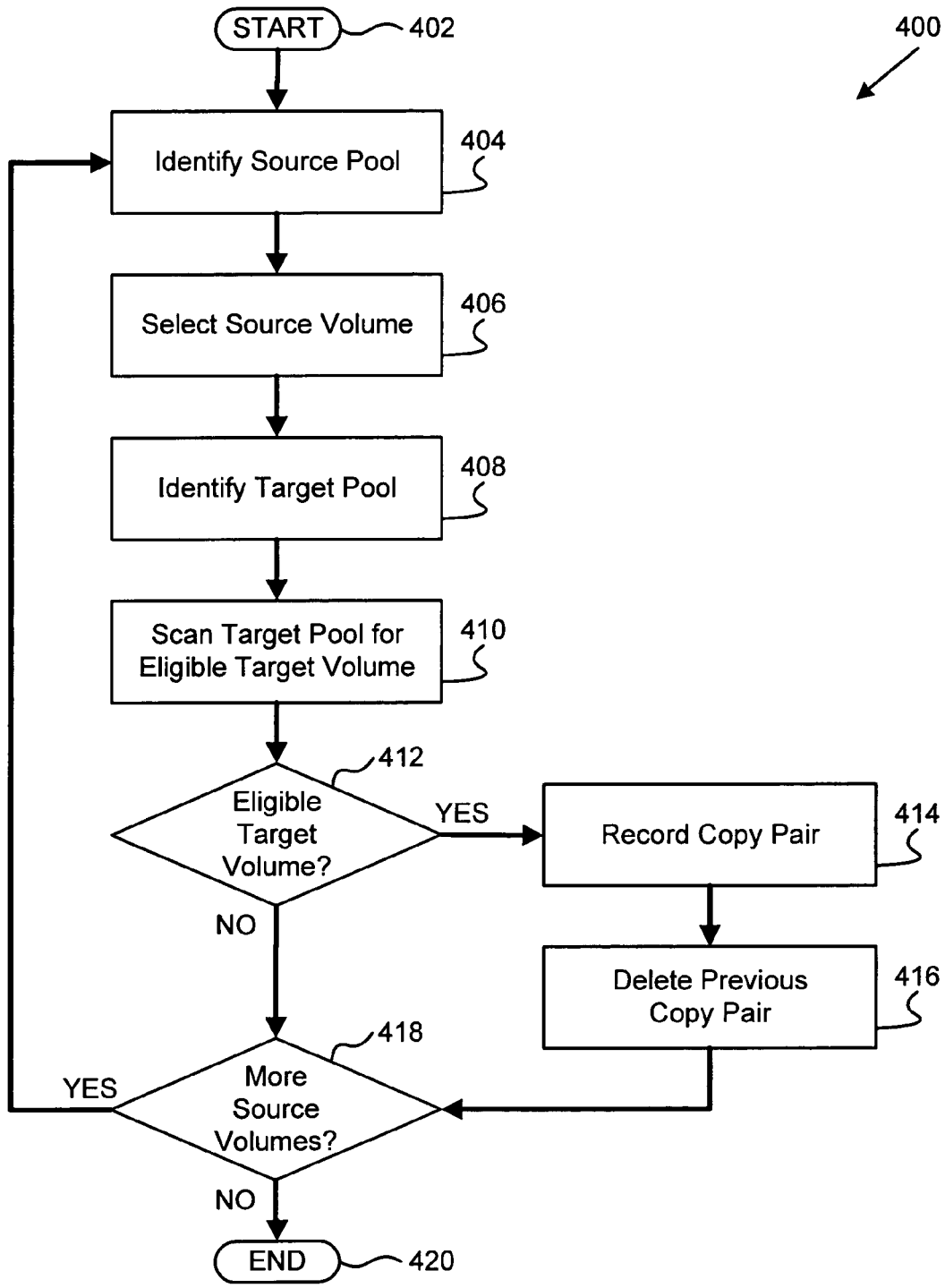
FIG. 4 is a schematic flow chart diagram illustrating one embodiment of a target selection method in accordance with the present invention.

FIG. 4 depicts one embodiment of a target selection method 400 that may be employed by the pre-pairing module 322 of the backup management apparatus 308 in certain embodiments of the present invention. Alternately, the target selection module 326 may perform the target selection method 400 in conjunction with or independently from the pre-pairing module 322. The illustrated target selection method 400 begins 402 by identifying 404 a source pool 202 and selecting 406 a source volume 208, 210 from the source pool 202.

The target selection method 400 attempts to find a compatible target volume 212, 214, 216, 218 to create a copy pair 226 with the selected 406 source volume 208, 210. In order to do so, the pre-pairing module 322, in one embodiment, may employ the target selection module 326 to identify 408 a target pool 204, 206 and scan 410 the target pool 204, 206. Scanning 410 the target pool 204, 206 is discussed in more detail with reference to FIG. 5.

The illustrated target selection method 400 subsequently determines 412 if an eligible target volume 212, 214, 216, 218 is found and, if so, records 414 the resulting copy pair 226 formed by the selected 406 source volume 208, 210 and the eligible target volume 212, 214, 216, 218. If a previous copy pair 226 for the selected 406 source volume 208, 210 exists, the record management module 328, in one embodiment, deletes 416 the previous copy pair 226. The pre-pairing module 322 or target selection module 326, in certain embodiments, then determines 418 if additional copy pairs 226 need to be created for any remaining source volumes 208, 210. If so, the target selection method 400 returns to identify 404 the proper source pool 202 and repeats the steps 406-416 described above. Otherwise, the depicted target selection method 400 then ends 420.

Figure 5:
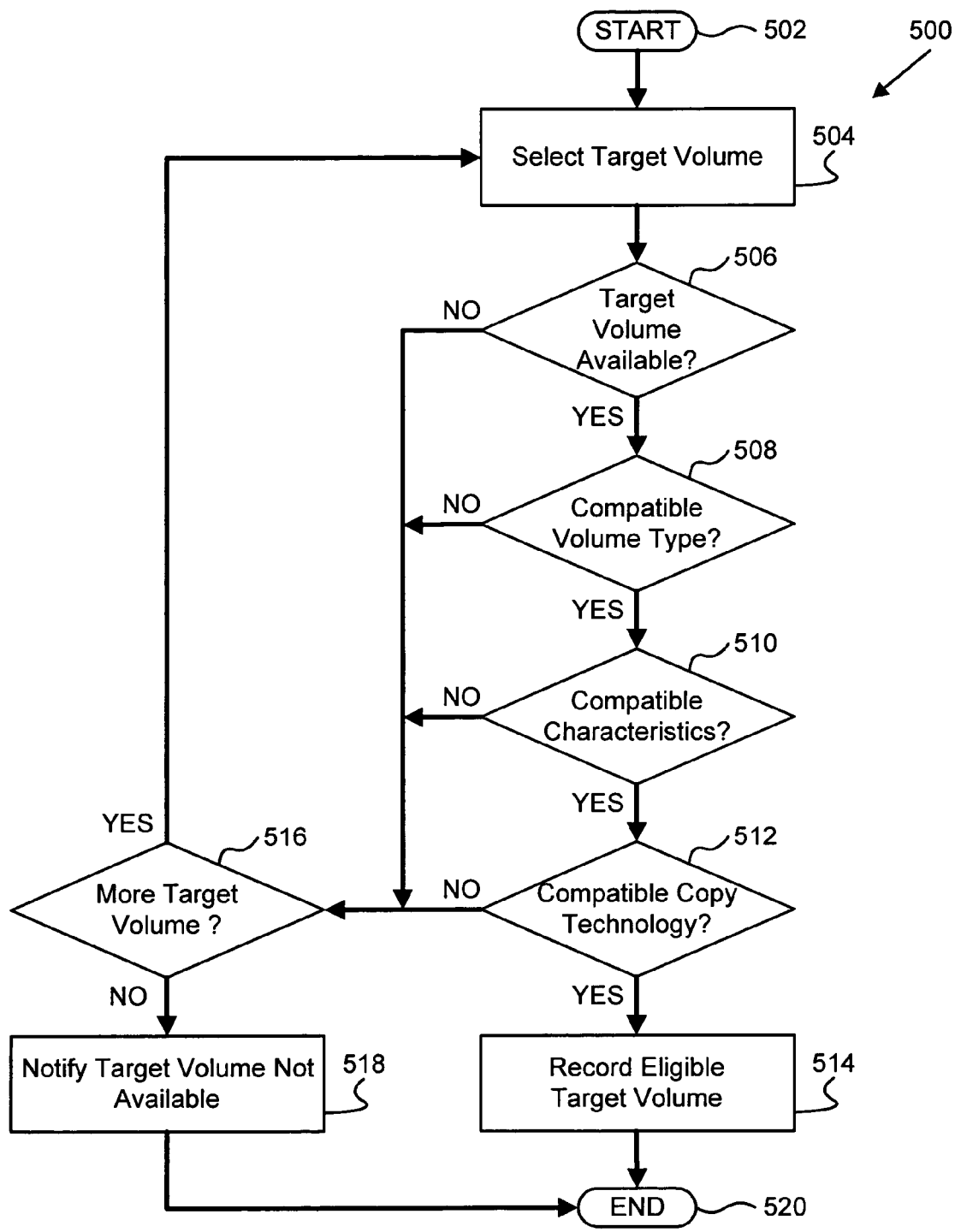
FIG. 5 is a schematic flow chart diagram illustrating one embodiment of a target scan method in accordance with the present invention.

FIG. 5 depicts one embodiment of a target scan method 500 that is given by way of example of the target scan step 410 of the target selection method 400 shown in FIG. 4. The target scan method 500 may be performed, in one embodiment, by the target selection module 326 of the backup management module 308. The illustrated target scan method 500 begins 502 by selecting a target volume 212, 214, 216, 218 from the target pool 204, 206 identified 408 in the target selection method 400 of FIG. 4.

For the selected 504 target volume 212, 214, 216, 218, the target selection module 326 determines 506 if the target volume 212, 214, 216, 218 is available (not reserved for another copy pair 226). The target selection module 326 then determines 508 if the target volume 212, 214, 216, 218 is a compatible volume type for the selected 406 source volume 208, 210. The target selection module 326 further determines 510 if the target volume 212, 214, 216, 218 has compatible characteristics, including geometry and storage size, with the source volume 208, 210.

Finally, in the depicted embodiment, the target selection module 326 determines 512 if the target volume 212, 214, 216, 218 employs a compatible copy technology for the source volume 208, 210. In one embodiment, the compatible copy technology may be a point-in-time copy technology, such as FlashCopy or SnapShot copy. Alternately, the compatible copy technology may be a traditional or other type of data copy technology.

If the target selection module 326 ultimately determines 506, 508, 510, 512 that the selected 504 target volume 212, 214, 216, 218 is available for use and compatible with the selected 406 source volume 208, 210, the target selection module 326 records 514 the eligible target volume 514 for use in the remaining steps of the target selection method 400 described with reference to FIG. 4. Otherwise, if the target selection module 326 determines 506, 508, 510, 512 that the selected 504 target volume 212, 214, 216, 218 is unavailable or is not compatible, the target selection module 326 determines 516 if additional target volumes 212, 214, 216, 218 may be scanned in the target pool 204, 206.

If additional target volumes 212, 214, 216, 218 may be scanned, the target scan method 500 returns to select 504 a subsequent target volume 212, 214, 216, 218. Otherwise, the target selection module 326, in one embodiment, sends 518 a notification, for example, to a network administrator, that there is not a target volume 212, 214, 216, 218 for use in a copy pair 226 with the selected 406 source volume 208, 210.

After sending 518 such a notification or after recording 514 an eligible target volume 212, 214, 216, 218, if one exists, the depicted target scan method 500 then ends 520.

Figure 6:
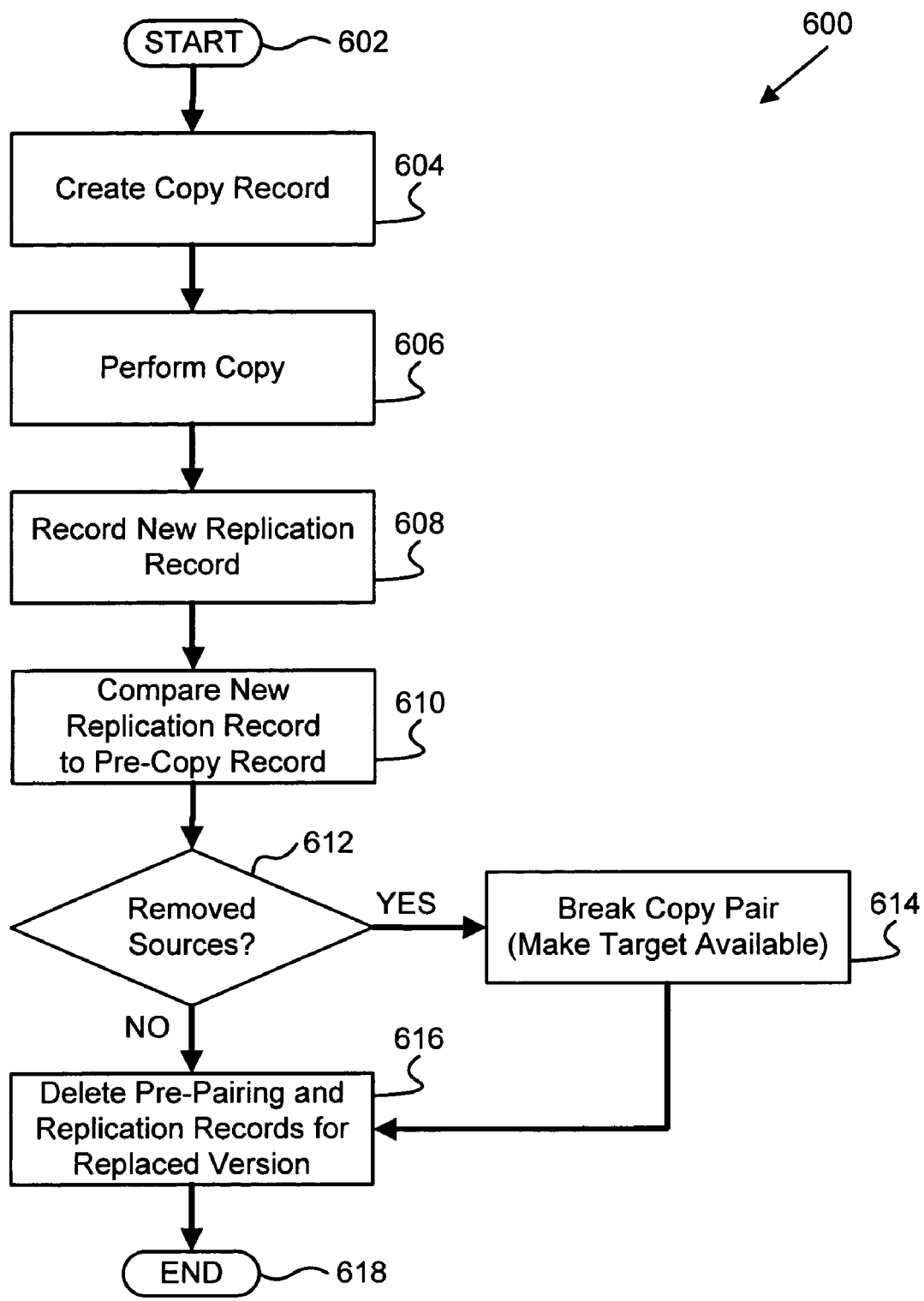
FIG. 6 is a schematic flow chart diagram illustrating one embodiment of a copy method in accordance with the present invention.

FIG. 6 depicts one embodiment of a copy method 600 that may be performed, for example, by the replication module 324 of the backup manager 300 shown in FIG. 3. The illustrated copy method 600 begins 602 by creating 604 a copy record for the current copy operation. In one embodiment, the replication module 324 may invoke the copy record module 334 to create the copy record. Creating 604 the copy record is discussed in further detail with reference to FIG. 7.

After creating 604 the copy record for the copy operation, the replication module 324, in one embodiment, performs 606 the copy operation to create a duplicate or backup copy of the datasets on a particular source volume 208, 210 or set of source volumes 208, 210 in a source pool 202. The replication module 324 subsequently creates and stores 608 a new replication record 318 that describes the backup copy stored on the corresponding target volumes 212, 214, 216, 218 in the corresponding target pool 204, 206. An example of replication records 318 is shown in Table 2.1 above.

The replication record management module 332 subsequently may compare 610 the new replication record 318 to any pre-copy record used in preparation of the copy operation. A pre-copy record generally is the pre-pairing record 320 or replication record 318 that is used to create 604 the copy record for the copy operation. The pre-copy record is discussed in more detail with reference to FIG. 7.

The replication record management module 332, in one embodiment, determines 612 if any source volumes 208, 210 have been removed from the source pool 202 since the pre-copy record was created. If one or more source volumes 208, 210 have been removed, the replication record management module 332 breaks 614 any copy pairs 226 associated with the removed source volume 208, 210. This makes the corresponding target volumes 212, 214, 216, 218 from the defunct copy pairs 226 available for use with the source volumes 208, 210 that remain in the source pool 202.

After the replication record management module 324 performs the above record cleanup operations, if necessary, the record management module 328 then deletes any pre-pairing records 320 and replication records 318 that correspond to the prior copy version 220, 222 replaced by the new copy version 220, 222 created by performing 606 the described copy operation. In one embodiment, the record management module 328 may invoke the pre-pairing record management module 330 and replication record management module 332 to delete the previous pre-pairing records 320 and replication records 318, respectively.

Figure 7:
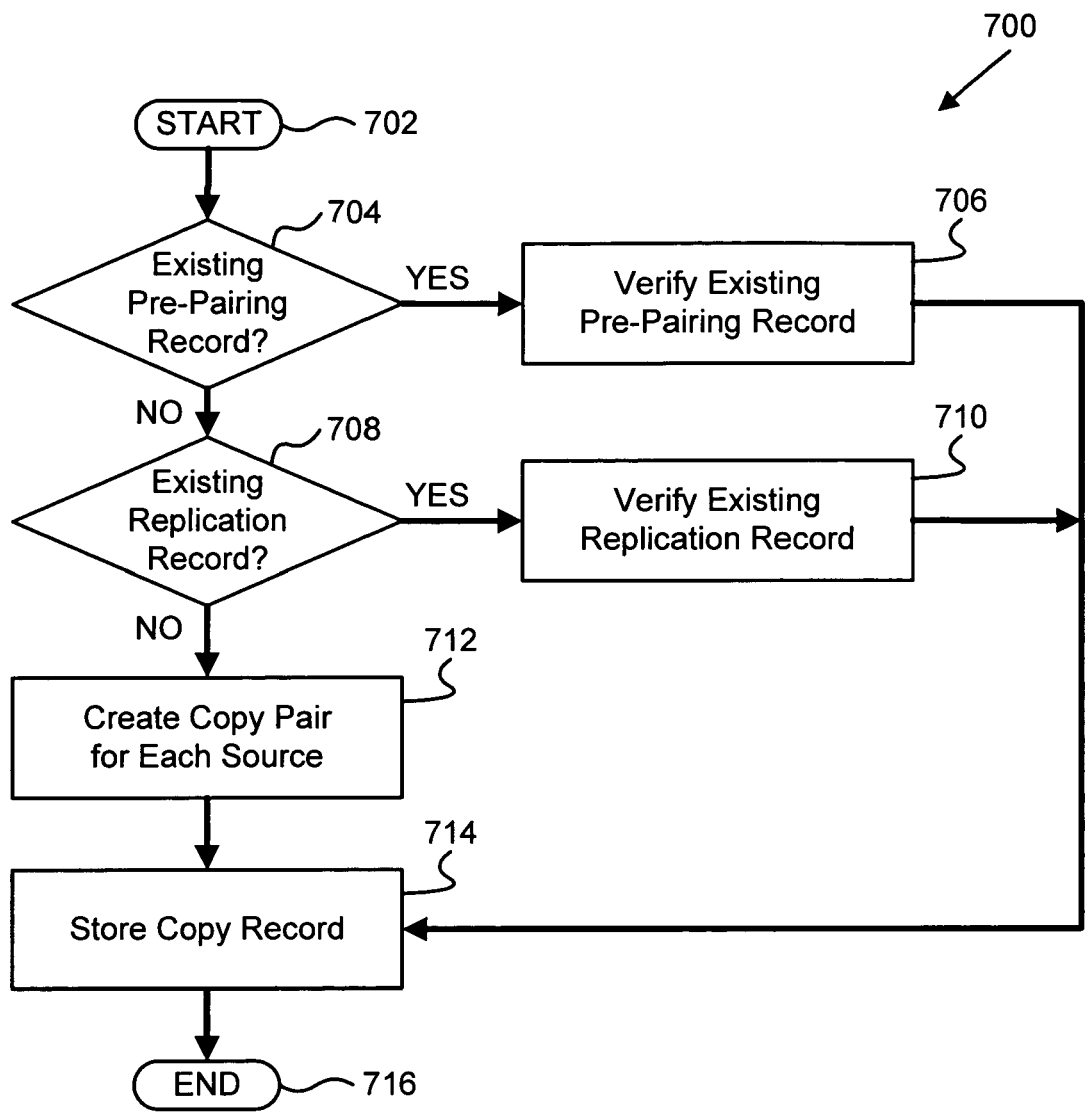
FIG. 7 is a schematic flow chart diagram illustrating one embodiment of a copy record method in accordance with the present invention.

FIG. 7 depicts one embodiment of a copy record method 700 that is given by way of example of the copy record creation step 604 of the copy method 600 shown in FIG. 6. The illustrated copy record method 700 begins 702 by determining 704 if a pre-pairing record 320 exists for the copy version 220, 222 that is to be created. For example, if a copy version "V2" 222 is about to be created, the copy record module 334 may employ the pre-pairing record management module 330, in one embodiment, to determine if a pre-pairing record 320 has been created in preparation for the new copy version "V2" 222. If a pre-pairing record 320 does exist, the copy record method 700 verifies the existing pre-pairing record 320 as described with reference to FIG. 8. In this scenario, the existing pre-pairing record 320 may be considered the pre-copy record.

If an existing pre-pairing record 320 does not exist, the copy record method 700 determines 708 if a replication record 318 exists for a previous copy version 220, 222 for the target pool 204, 206 that will be used for the new copy version 220, 222. For example, if two copy versions 220, 222 are maintained for a given source pool 202 and a third copy version 220, 222, is to be created, the copy record module 334 may determine 708 if a replication record 318 corresponding to the first copy version "V1" 220, 222 exists and can be used as a pre-copy record for the third copy version "V3" 220, 222. If a replication record 318 does exist, the copy record method 700 verifies the existing replication record 318 as described with reference to FIG. 8. In this scenario, the existing replication record 318 may be considered the pre-copy record.

If neither a pre-pairing record 320 for the new copy version 220, 222 nor a replication record 318 for a previous copy version 220, 222 exists, the copy record method 700, in the depicted embodiment, creates 712 a copy pair 226 for each source volume 208, 210 in the source pool 202. In one embodiment, the copy record method 700 may employ the target selection method 400 and target scan method 500 in order to create 712 the copy pairs 712 for the source pool 202. The copy record module 334 then stores 714 the copy record for use during the copy method 600 described with reference to FIG. 6. The depicted copy record method 700 then ends 716.

Figure 8:
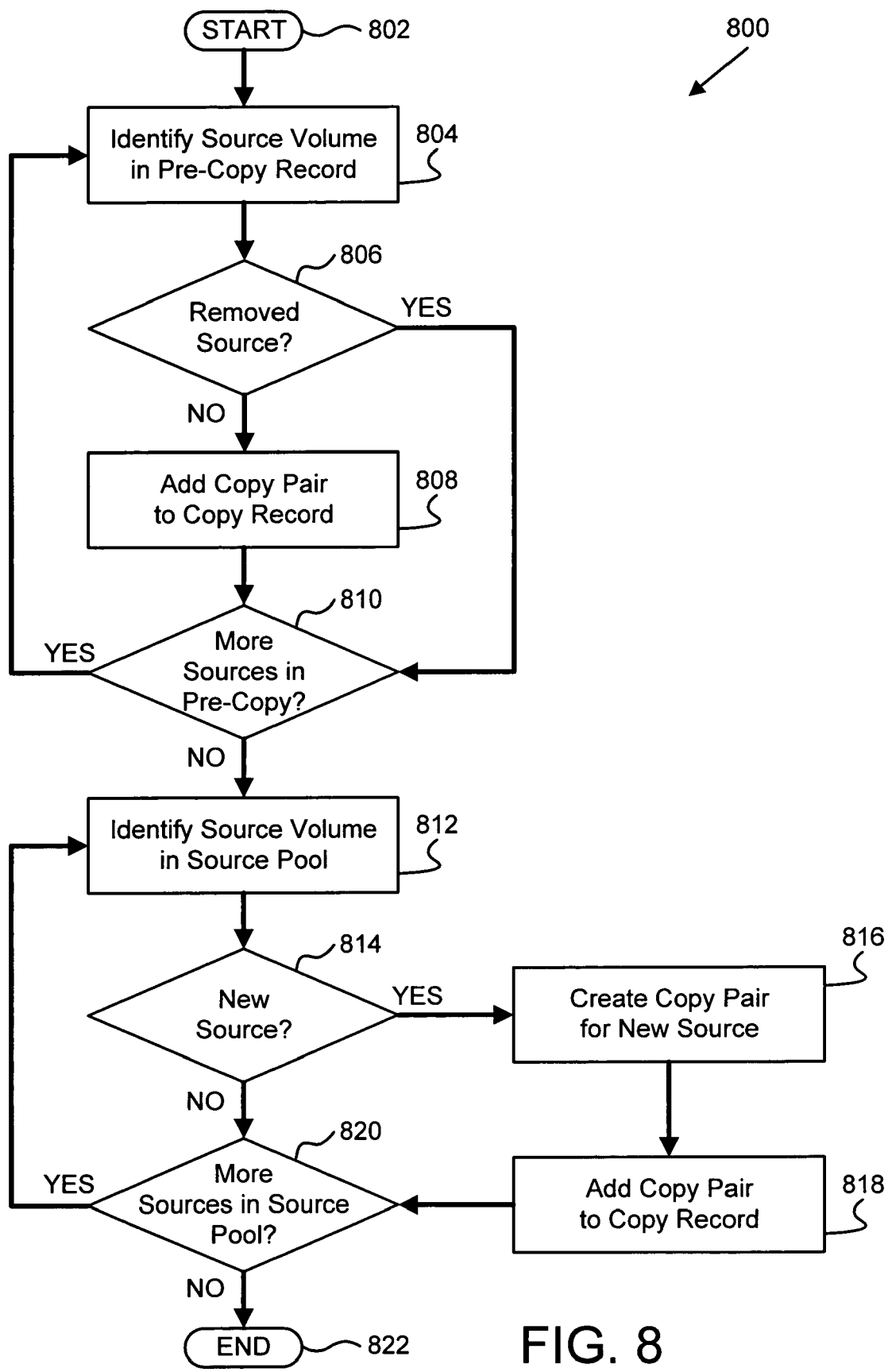
FIG. 8 is a schematic flow chart diagram illustrating one embodiment of a record verification method in accordance with the present invention.

FIG. 8 depicts one embodiment of a record verification method 800 given by way of example of the record verification steps 706, 712 of the copy record method 700 shown in FIG. 7. The illustrated record verification method 800 begins 802 by identifying a source volume 208, 210 in the pre-copy record. As described above, the pre-copy record may be either a pre-pairing record 320 for the new copy version 220, 222 or a replication record 318 for a previous copy version 220, 222.

The record verification method 800 then determines 806 if the identified 804 source volume 208, 210 in the pre-copy record has been removed from the source pool 202 since the pre-copy record was created. If the source volume 208, 210 has not been removed from the source pool 202, the record verification method 800 adds the corresponding copy pair 226 to the copy record. After adding the copy pair 226 to the copy record or after determining that the identified 804 source volume 208, 210 has not been removed from the source pool 202, the record verification method 800 determines 810 if more source volumes 208, 210 are in the pre-copy record. If so, the record verification method 800 returns to identify 804 a subsequent source volume 208, 210 and repeat the steps 806-810 described above.

After verifying all of the source volumes 208, 210 initially in the pre-copy record, the record verification method 800 identifies 812 a source volume 208, 210 in the source pool 202 and determines 814 if a new source volume 208, 210 has been added to the source pool 202 since the pre-copy record was created. If a new source volume 208, 210 has been added to the source pool 202, the record verification method 800 creates 816 a new copy pair 226 for the new source volume 208, 210. In one embodiment, the record verification method 800 invokes the target selection method 400 and target scan method 500 to create 808 the new copy pair 226. The record verification method 800 then adds 818 the new copy pair 226 to the current copy record and determines 820 if additional source volumes 208, 210 are in the source pool 202. If so, the record verification method 800 returns to identify 812 a subsequent source volume 208, 210 in the source pool 210 and repeat the steps 814-820 described above. After verifying all of the source volumes 208, 210 in the source pool 202, the depicted record verification method 800 then ends 822.

By way of example, a sample version chronology is attached in Appendix A. The sample version chronology shows the record status of the data copy environment over seven copy versions 220, 222. Additionally, the sample version chronology shows the record status prior to (for example, "T1⁻") and subsequent to (for example, "T1⁺") each copy operation (for example, "T1"). The sample version chronology provided is understood to be an example of one way in which the data copy environment 100 may function, but is not limiting or inclusive of all of the variations, benefits, operations, and so forth that may be performed by or in conjunction with the embodiments of the present invention described herein.

The apparatus, system, and method described above advantageously facilitate maintaining multiple sets of records to describe distinct states of the data copy environment, handling changes in the data copy environment that affect the copy pairs in the pre-pairing and replication records, and maintaining the records over a plurality of copy versions of a source pool in the data copy environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for managing multiple copy versions of a source volume, the apparatus comprising: a replication record management module comprising executable code stored on a semiconductor device, executed by a processor, and configured to maintain a current replication record descriptive of a current copy version of a source volume and comprising a time, a copy version, and at least one copy pair, and maintain a previous replication record descriptive of a previous copy version;

a pre-pairing module comprising executable code stored on the semiconductor device, executed by the processor, and configured to create a future pre-pairing record descriptive of a future copy version of the source volume and comprising a time, a copy version, and at least one copy pair;

a pre-pairing record management module configured to maintain the future pre-pairing record, and a previous pre-pairing record descriptive of a previous copy version;

a copy record module comprising executable code stored on the semiconductor device, executed by the processor, and configured to create a copy record from a pre-copy record, the pre-copy record comprising the future pre-pairing record if the future pre-pairing record exists else comprising the current replication record;

a replication module comprising executable code stored on the semiconductor device, executed by the processor, and configured to replicate the source volume on a target volume, create a new copy version of the source volume according to the copy record, and establish a new replication record descriptive of the new copy version of the source volume; and the replication record management module is further configured to compare the new replication record to the current replication record and to break a copy pair for a removed source volume present in the current replication record, but not present in the new replication record.

2. The apparatus of claim 1, further comprising a target selection module comprising executable code stored on the semiconductor device, executed by the processor, and configured to locate a target volume available for use to create a copy version of the source volume.

3. The apparatus of claim 1, wherein the copy record module is further configured to verify the future pre-pairing record and to account for a change in one of a source pool and a target pool.

4. The apparatus of claim 1, wherein the copy record module is further configured to verify the current replication record and to account for a change in one of a source pool and a target pool.

5. An apparatus for managing multiple copy versions of a source volume, the apparatus comprising:
- a replication record management module comprising executable code stored on a semiconductor device, executed by a processor, and configured to maintain a plurality of replication records, each replication record descriptive of a copy version of a source volume, the replication records comprising a current replication record and a previous replication record descriptive of a previous copy version, the replication records comprising a time, a copy version, and at least one copy pair;
- a pre-pairing module comprising executable code stored on the semiconductor device, executed by the processor, and configured to create a future pre-pairing record descriptive of a future copy version of the source volume and comprising a time, a copy version, and at least one copy pair;
- a pre-pairing record management module comprising executable code stored on the semiconductor device, executed by the processor, and configured to maintain a plurality of pre-pairing records, each pre-pairing record descriptive of a copy version of the source volume, the pre-pairing records comprising the future pre-pairing record and a previous pre-pairing record descriptive of a previous copy version;
- a copy record module comprising executable code stored on the semiconductor device, executed by the processor, and configured to create a copy record from a pre-copy record, the pre-copy record comprising the future pre-pairing record if the future pre-pairing record exists else comprising the current replication record;
- a replication module comprising executable code stored on the semiconductor device, executed by the processor, and configured to replicate the source volume on a target volume, create a new copy version of the source volume according to the copy record, and establish a new replication record descriptive of the new copy version of the source volume;
- the replication record management module is further configured to compare the new replication record to the current replication record and to break a copy pair for a removed source volume present in the current replication record, but not present in the new replication record; and
- a record management module comprising executable code stored on the semiconductor device, executed by the processor, and configured to dynamically manage the plurality of replication records and pre-pairing records in response to a change in the data copy environment.

6. The apparatus of claim 5, wherein the change in the data copy environment comprises an addition of a source volume to a source pool.

7. The apparatus of claim 5, wherein the change in the data copy environment comprises a removal of a source volume from a source pool.

8. The apparatus of claim 5, wherein the change in the data copy environment comprises an addition of a target volume from a target pool.

9. The apparatus of claim 5, wherein the change in the data copy environment comprises a removal of a target volume from a target pool.

10. The apparatus of claim 5, wherein dynamically managing the plurality of replication records comprises verifying the current status of a volume in the data copy environment and updating a replication record in response to a change from a previous status of the volume.

11. A system for managing multiple copy versions of a source volume, the system comprising:
- a storage subsystem configured to store backup data;
- a backup manager comprising executable code stored on a semiconductor device, executed by a processor, and configured to direct the storage subsystem to create a plurality of copy versions from a plurality of source volumes and to store backup information descriptive of each of the plurality of copy versions;
- a backup management apparatus configured to manage the plurality of copy versions and the backup information descriptive of each of the plurality of copy versions;
- a replication record management module comprising executable code stored on the semiconductor device, executed by the processor, and configured to maintain a current replication record descriptive of a current copy version of a source volume, and maintain a previous replication record descriptive of a previous copy version;
- a pre-pairing module comprising executable code stored on the semiconductor device, executed by the processor, and configured to create a future pre-pairing record descriptive of a future copy version of the source volume and comprising a time, a copy version, and at least one copy pair;
- a pre-pairing record management module comprising executable code stored on the semiconductor device, executed by the processor, and configured to maintain the future pre-pairing record and a previous pre-pairing record descriptive of a previous copy version; and a copy record module comprising executable code stored on the semiconductor device, executed by the processor, and configured to create a copy record from a pre-copy record, the pre-copy record comprising the future pre-pairing record if the future pre-pairing record exists else comprising the current replication record;
- a replication module comprising executable code stored on the semiconductor device, executed by the processor, and configured to replicate the source volume on a target volume, create a new copy version of the source volume according to the copy record, and establish a new replication record descriptive of the new copy version of the source volume; and
- the replication record management module is further configured to compare the new replication record to the current replication record and to break a copy pair for a removed source volume present in the current replication record, but not present in the new replication record.

12. The system of claim 11, wherein the backup manager further comprises a backup information module configured to store the backup information, the backup information comprising a replication record, a volume inventory, a copy pool inventory, and a dataset inventory.

13. The system of claim 11, wherein the backup manager further comprises a backup information module configured to store the backup information, the backup information comprising pre-pair record descriptive of a future copy version of one of the source volumes.

14. A computer readable storage medium comprising computer readable code configured to carry out a method for managing multiple copy versions of a source volume, the method comprising:

maintaining a current replication record descriptive of a current copy version of a source volume;

maintaining a previous replication record descriptive of a previous copy version; creating a future pre-pairing record descriptive of a future copy version of the source volume and comprising a time, a copy version, and at least one copy pair;

maintaining the future pre-pairing record;

maintaining a previous pre-pairing record descriptive of a previous copy version;

creating a copy record from a pre-copy record, the pre-copy record comprising the future pre-pairing record if the future pre-pairing record exists else comprising the current replication record;

replicating the source volume on a target volume, creating a new copy version of the source volume according to the copy record;

establishing a new replication record descriptive of the new copy version of the source volume;

comparing the new replication record to the current replication record; and breaking a copy pair for a removed source volume present in the current replication record, but not present in the new replication record.

15. The computer readable storage medium of claim 14, wherein the method further comprises locating a target volume available for use to create a copy version of the source volume.

16. The computer readable storage medium of claim 14, wherein the method further comprises verifying the future pre-pairing record, accounting for a change in one of a source pool and a target pool.

17. The computer readable storage medium of claim 14, wherein the method further comprises verifying the current replication record, accounting for a change in one of a source pool and a target pool.

18. A method for managing multiple copy versions of a source volume, the method comprising:

maintaining a current replication record descriptive of a current copy version of a source volume;

maintaining a previous replication record descriptive of a previous copy version;

creating a future pre-pairing record descriptive of a future copy version of the source volume and comprising a time, a copy version, and at least one copy pair;

maintaining the future pre-pairing record;

maintaining a previous pre-pairing record descriptive of a previous copy version;

creating a copy record from a pre-copy record, the pre-copy record comprising the future pre-pairing record if the future pre-pairing record exists else comprising the current replication record;

replicating the source volume on a target volume, creating a new copy version of the source volume according to the copy record;

establishing a new replication record descriptive of the new copy version of the source volume;

comparing the new replication record to the current replication record; and breaking a copy pair for a removed source volume present in the current replication record, but not present in the new replication record.

19. A method for managing multiple copy versions of a source volume, the method comprising:

maintaining a current replication record descriptive of a current copy version of a source volume;

maintaining a previous replication record descriptive of a previous copy version;

creating a future pre-pairing record descriptive of a future copy version of the source volume and comprising a time, a copy version, and at least one copy pair;

maintaining the future pre-pairing record;

maintaining a previous pre-pairing record descriptive of a previous copy version;

creating a copy record from a pre-copy record, the pre-copy record comprising the future pre-pairing record if the future pre-pairing record exists else comprising the current replication record;

replicating the source volume on a target volume and create a new copy version of the source volume according to the copy record;

establishing a new replication record descriptive of the new copy version of the source volume;

maintaining a replication record descriptive of a previous copy version;

verifying the pre-copy record, accounting for a change in one of a source pool and a target pool;

replicating the source volume on a target volume, creating a new copy version of the source volume according to the copy record;

establishing a new replication record descriptive of the new copy version of the source volume;

comparing the new replication record to the current replication record; and breaking a copy pair for a removed source volume present in the current replication record, but not present in the new replication record.

20. An apparatus for managing multiple copy versions of a source volume, the apparatus comprising:

means for maintaining a current replication record descriptive of a current copy version of a source volume and maintaining a previous replication record descriptive of a previous copy version, the replication record maintaining means comprising executable code stored on a semiconductor device and executed by a processor;

means for creating a future pre-pairing record descriptive of a future copy version of the source volume and comprising a time, a copy version, and at least one copy pair, the pre-pairing record creating means comprising executable code stored on the semiconductor device and executed by the processor;

means for maintaining the future pre-pairing record and a previous pre-pairing record descriptive of a previous copy version, the pre-pairing record maintaining means comprising executable code stored on the semiconductor device and executed by the processor;

means for creating a copy record from a pre-copy record, the pre-copy record comprising the future pre-pairing record if the future pre-pairing record exists else comprising the current replication record, the copy record creating means comprising executable code stored on the semiconductor device and executed by the processor;

means for replicating the source volume on a target volume, creating a new copy version of the source volume according to the copy record, the replicating means comprising executable code stored on the semiconductor device and executed by the processor;

means for establishing a new replication record descriptive of the new copy version of the source volume, the establishing means comprising executable code stored on the semiconductor device and executed by the processor;

means for comparing the new replication record to the current replication record the comparing means comprising executable code stored on the semiconductor device and executed by the processor; and means for breaking a copy pair for a removed source volume present in the current replication record, but not present in the new replication record, the breaking means comprising executable code stored on the semiconductor device and executed by the processor.

* * * * *